United States Patent
Tamura

(10) Patent No.: US 9,958,662 B2
(45) Date of Patent: May 1, 2018

(54) MICROSCOPE SYSTEM AND ILLUMINATION OPERATION DEVICE

(71) Applicant: OLYMPUS CORPORATION, Tokyo (JP)

(72) Inventor: Yosuke Tamura, Kawaguchi (JP)

(73) Assignee: OLYMPUS CORPORATION, Tokyo (JP)

( * ) Notice: Subject to any disclaimer, the term of this patent is extended or adjusted under 35 U.S.C. 154(b) by 189 days.

(21) Appl. No.: 15/146,040

(22) Filed: May 4, 2016

(65) Prior Publication Data

US 2016/0327778 A1 Nov. 10, 2016

(30) Foreign Application Priority Data

May 8, 2015 (JP) ................. 2015-095714

(51) Int. Cl.
*G02B 21/06* (2006.01)
*G02B 21/10* (2006.01)
*G02B 21/08* (2006.01)

(52) U.S. Cl.
CPC ........... *G02B 21/10* (2013.01); *G02B 21/084* (2013.01)

(58) Field of Classification Search
CPC .. G02B 21/00; G02B 21/0004; G02B 21/002; G02B 21/0032; G02B 21/0028; G02B 21/0052; G02B 21/0076; G02B 21/008; G02B 21/0084; G02B 21/06; G02B 21/08; G02B 21/082; G02B 21/084; G02B 21/36; G02B 21/361
USPC ....... 359/362, 363, 368, 369, 385, 387, 388, 359/389, 390
See application file for complete search history.

(56) References Cited

U.S. PATENT DOCUMENTS

| | | | | |
|---|---|---|---|---|
| 4,948,247 A * | 8/1990 | Lapeyre | ................... | G01P 3/40 356/23 |
| 5,690,417 A * | 11/1997 | Polidor | ............... | G02B 21/084 359/387 |
| 6,454,437 B1 * | 9/2002 | Kelly | ....................... | G01J 3/10 359/287 |
| 7,832,894 B2 * | 11/2010 | Rudolph | .................. | F21K 9/00 359/387 |
| 9,690,088 B2 * | 6/2017 | Karube | ................ | G02B 21/06 |

(Continued)

FOREIGN PATENT DOCUMENTS

| | | | | |
|---|---|---|---|---|
| CA | 2631722 C | * | 7/2013 | ............... G01J 3/18 |
| JP | 2005-227442 A | | 8/2005 | |

*Primary Examiner* — Arnel C Lavarias
(74) *Attorney, Agent, or Firm* — Scully, Scott, Murphy & Presser, P.C.

(57) ABSTRACT

A microscope system includes: a stage on which a specimen is configured to be placed; an objective lens disposed so as to face the stage; an oblique illumination unit having a plurality of light emitting units arranged annularly around or outside the objective lens, the oblique illumination unit being configured to emit oblique illumination light for irradiating the specimen; an input unit configured to receive an instruction signal that instructs a rotation mode for changing, at regular intervals, a light emitting area where one or more light emitting units of the plurality of light emitting units are caused to emit the oblique illumination light; and an illumination controller configured to change the light emitting area at the regular intervals by controlling light emitting timing of each of the plurality of light emitting units when the input unit receives the instruction signal.

12 Claims, 13 Drawing Sheets

(56) References Cited

U.S. PATENT DOCUMENTS

2013/0170024 A1* 7/2013 Teplitz ................. G02B 21/084
                                                    359/387
2014/0340742 A1* 11/2014 Fahlbusch .............. G02B 21/10
                                                    359/387

* cited by examiner

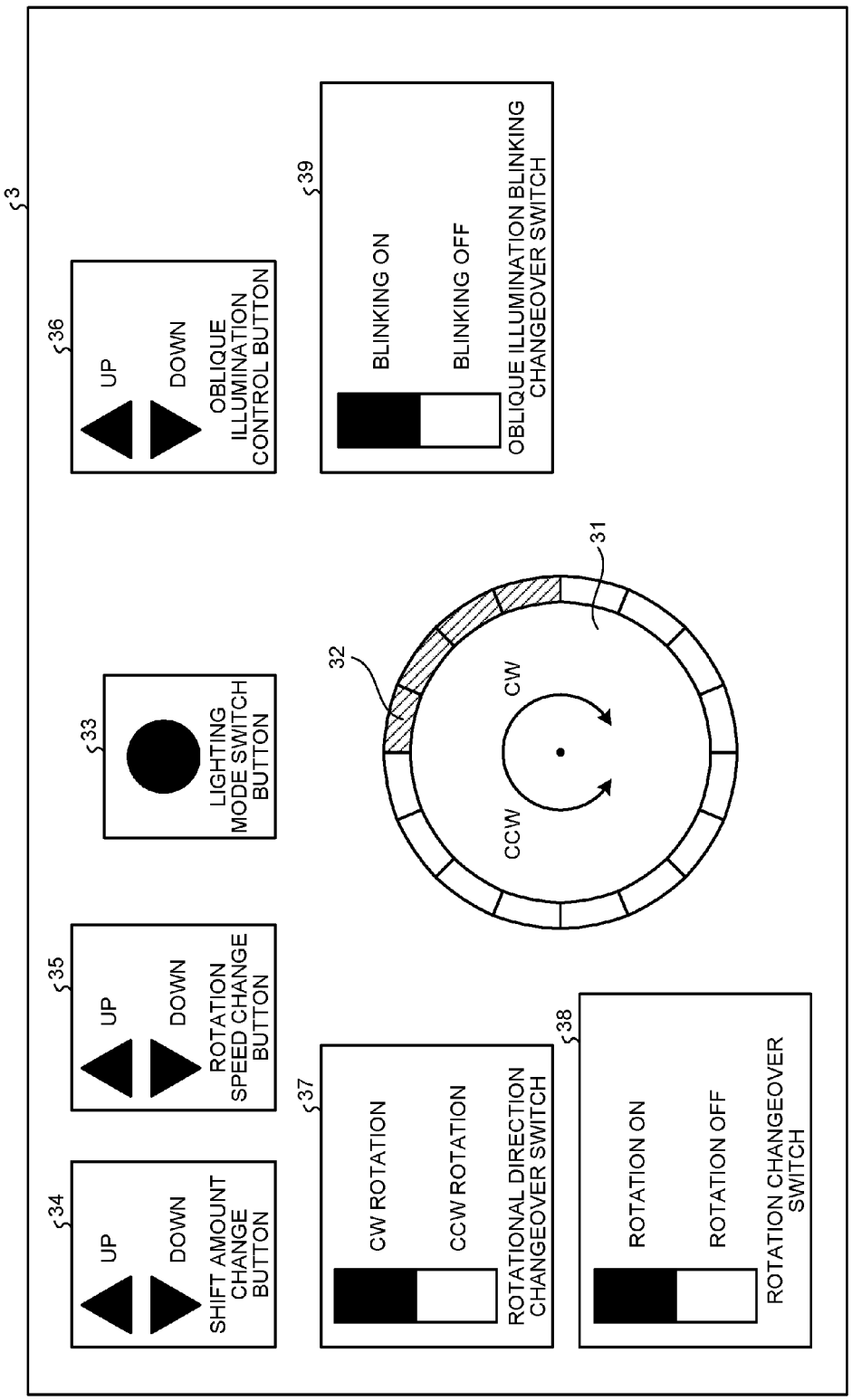

MICROSCOPE SYSTEM AND ILLUMINATION OPERATION DEVICE

CROSS REFERENCES TO RELATED APPLICATIONS

This application is based upon and claims the benefit of priority from Japanese Patent Application No. 2015-095714, filed on May 8, 2015, the entire contents of which are incorporated herein by reference.

BACKGROUND

1. Technical Field

The disclosure relates to a microscope system configured to emit illumination light obliquely to a specimen and to collect light reflected from the specimen to form an image for observation, and relates to an illumination operation device.

2. Related Art

In related art, a known technology provides a microscope system with an oblique illumination unit including a plurality of light emitting units arranged annularly around the optical axis of objective lenses, to emit light obliquely to a specimen, and collect light scattered from the specimen so as to form an image for observation (refer to Japanese Laid-open Patent Publication No. 2005-227442). With this technology, a user changes a light emitting area of the oblique illumination unit by operating a hand switch to observe microscopic damage and irregularity on a specimen.

SUMMARY

In some embodiments, a microscope system includes: a stage on which a specimen is configured to be placed; an objective lens disposed so as to face the stage; an oblique illumination unit having a plurality of light emitting units arranged annularly around or outside the objective lens, the oblique illumination unit being configured to emit oblique illumination light for irradiating the specimen; an input unit configured to receive an instruction signal that instructs a rotation mode for changing, at regular intervals, a light emitting area where one or more light emitting units of the plurality of light emitting units are caused to emit the oblique illumination light; and an illumination controller configured to change the light emitting area at the regular intervals by controlling light emitting timing of each of the plurality of light emitting units when the input unit receives the instruction signal.

In some embodiments, an illumination operation device is configured to be connected to a microscope apparatus, the microscope apparatus including: a stage on which a specimen is configured to be placed; an objective lens disposed so as to face the stage; and an oblique illumination unit having a plurality of light emitting units arranged annularly around or outside the objective lens, the oblique illumination unit being configured to emit oblique illumination light for irradiating the specimen. The illumination operation device includes: an input unit that is rotatable about a predetermined axis and is configured to receive a change signal for changing a range of a light emitting area where one or more light emitting units of the plurality of light emitting units are caused to emit the oblique illumination light, and a plurality of lighting portions arranged annularly around the input unit and configured to turn on according to light emission of each of the plurality of light emitting units.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram illustrating a schematic configuration of an illumination operating unit according to the first embodiment of the present invention;

DETAILED DESCRIPTION

Figure 1:
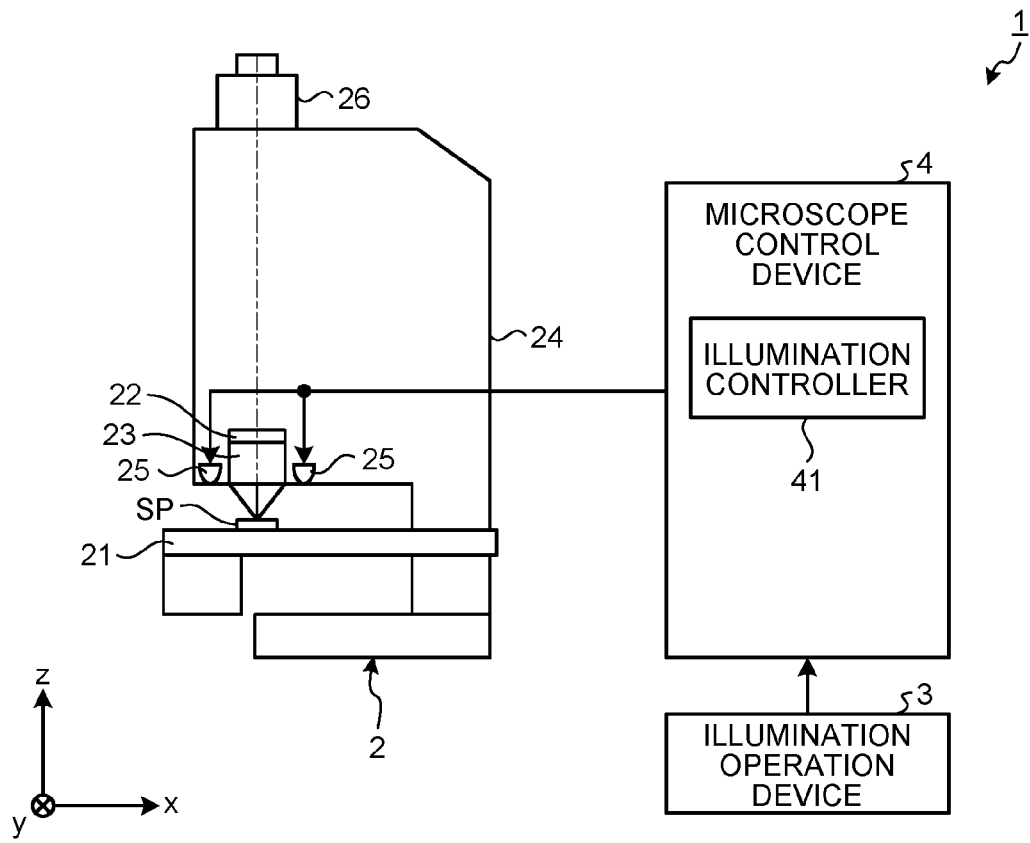
FIG. 1 is a block diagram illustrating a schematic configuration of a microscope system according to a first embodiment of the present invention.

Modes for carrying out the present invention (hereinafter referred to as "embodiments") will now be described with reference to the drawings. The present invention is not limited to the embodiments described below. The drawings referred to in the description below merely illustrate shapes, magnitudes, and positional relations to such an extent that help the subject matter of the invention be understood. Thus, the present invention is not limited to the shapes, magnitudes, and positional relations illustrated in the drawings.

First Embodiment

Configuration of Microscope System

FIG. 1 is a block diagram illustrating a schematic configuration of a microscope system according to a first embodiment of the present invention. In FIG. 1, a plane on which a microscope system 1 is placed will be referred to as an xy plane, and the direction perpendicular to the xy plane will be referred to as a z direction.

The microscope system 1 illustrated in FIG. 1 includes a microscope apparatus 2 for observation of a specimen SP, an illumination operation device 3 configured to receive an instruction signal that instructs illumination light to be emitted to a specimen SP by the microscope apparatus 2, and a microscope control device 4 configured to control driving of the microscope apparatus 2. The microscope apparatus 2, the illumination operation device 3, and the microscope control device 4 are connected by wire or wireless connection in such a manner that data can be transmitted and received to and from one another.

Configuration of Microscope Apparatus

First, a configuration of the microscope apparatus 2 will be described.

The microscope apparatus 2 includes a stage 21, a revolver 22, objective lenses 23, a microscope main unit 24, an oblique illumination unit 25, and an eyepiece 26.

A specimen SP is placed on the stage 21. The stage 21 is movable in x, y, and z directions, and is configured to move in response to operation of a stage operating unit (not shown). The stage 21 may be an electric stage provided with a drive unit such as a motor and capable of moving in the x, y, and z directions under the control of the microscope control device 4.

The revolver 22 is provided slidably or rotatably relative to the microscope main unit 24 to position the objective lens 23 above the specimen SP. The revolver 22 holds a plurality of objective lenses 23 having different magnifications (observation magnification).

The objective lenses 23 are mounted on the revolver 22. The objective lenses 23 are arranged to face the stage 21. The magnifications of the objective lenses 23 are merely examples, and can be changed as necessary such as 10×, 100×, etc.

The microscope main unit 24 has a substantially C-shape in side view, movably supports the stage 21, and holds the objective lenses 23 with the revolver 22.

The oblique illumination unit 25 has a plurality of light emitting units arranged annularly around the objective lenses 23 or on a gear unit, and emits oblique illumination light to the specimen SP from outside of the optical axis centers of the objective lenses 23 under the control of the microscope control device 4.

Figure 2:
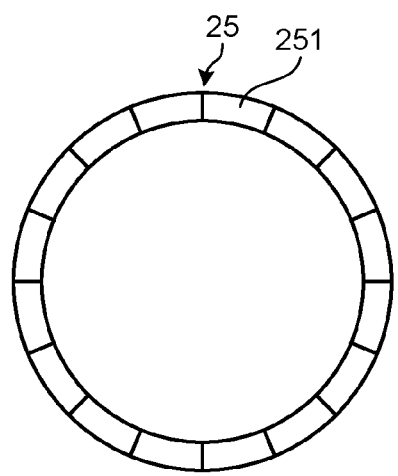
FIG. 2 is a schematic view illustrating a schematic configuration of an oblique illumination unit according to the first embodiment of the present invention.

FIG. 2 is a schematic view illustrating a schematic configuration of the oblique illumination unit 25. As illustrated in FIG. 2, the oblique illumination unit 25 is constituted by a plurality of light emitting units 251. The light emitting units 251 are arranged annularly (in a ring) around the objective lenses 23. The light emitting units 251 are constituted by light emitting diodes (LED) or the like.

The eyepiece 26 collects light reflected from the specimen SP and forms an observation image of the specimen SP. A user observes the observation image of the specimen SP through the eyepiece 26.

Configuration of Illumination Operating Unit

Next, a configuration of the illumination operation device 3 will be described. The illumination operation device 3 receives an instruction signal that causes the oblique illumination unit 25 to turn on. The illumination operation device 3 is configured by buttons, switches, dials, and the like. In the first embodiment, the illumination operation device 3 functions as an input unit.

FIG. 3 is a schematic diagram illustrating a schematic configuration of the illumination operation device 3. The illumination operation device 3 illustrated in FIG. 3 includes a dial 31, lighting portions 32, a lighting mode switch button 33, a shift amount change button 34, a rotation speed change button 35, an oblique illumination control button 36, a rotational direction changeover switch 37, a rotation changeover switch 38, and an oblique illumination blinking changeover switch 39.

The dial 31 is rotatable about a predetermined axis, and receives a change signal for changing the range of a light emitting area, where light emitting units 251 of the oblique illumination unit 25 are to emit light, and receives a rotation signal that instructs the rotational direction of the light emitting area of the oblique illumination unit 25. The dial 31 is configured by a columnar member and a photointerrupter or the like configured to detect rotation.

A plurality of lighting portions 32 are provided annularly around the dial 31. The lighting portions 32 at positions corresponding to light emission of the light emitting units 251 of the oblique illumination unit 25, are configured to turned on.

The lighting mode switch button 33 receives a pattern signal that instructs a lighting pattern for emitting oblique illumination light to the specimen SP while sequentially changing the light emitting area, where the light emitting units 251 of the oblique illumination unit 25 emit light, by switching between preset patterns.

The shift amount change button 34 receives a shift signal for changing the shift amount of the light emitting area where the light emitting units 251 of the oblique illumination unit 25 emit light.

The rotation speed change button 35 receives a rotation speed signal for changing the moving speed of the rotating light emitting area during a rotation process performed by the oblique illumination unit 25.

The oblique illumination control button 36 receives a light quantity instruction signal that instructs the light quantity of the oblique illumination light emitted by the oblique illumination unit 25.

The rotational direction changeover switch 37 receives a direction signal that instructs the rotational direction of the light emitting area during the rotation process performed by the oblique illumination unit 25.

The rotation changeover switch 38 receives an instruction signal that instructs a rotation mode to change, at regular intervals, the light emitting area where one or more of the light emitting units 251 of the oblique illumination unit 25 are caused to emit light, or receives a stop signal for stopping the rotation mode.

The oblique illumination blinking changeover switch 39 receives a blinking signal that instructs blinking operation of repeating blinking and lighting of the light emitting units 251 of the oblique illumination unit 25 at predetermined intervals, or receives a lighting signal that instructs lighting of the light emitting units 251.

Configuration of Microscope Control Device

Next, a configuration of the microscope control device 4 will be described.

The microscope control device 4 includes a central processing unit (CPU) or the like, and controls driving of the microscope apparatus 2. The microscope control device 4 includes an illumination controller 41.

The illumination controller 41 controls the oblique illumination unit 25 according to the instruction signal input from the illumination operation device 3. Specifically, the illumination controller 41 continuously moves the light emitting area of the oblique illumination unit 25 while changing the light emitting area at regular intervals by controlling the light emitting timing of each of the light emitting units 251 of the oblique illumination unit 25 according to the instruction signal input from the illumination operation device 3.

Operation of Microscope System

Next, reference will be made to illumination control of the oblique illumination unit 25 performed by the illumination controller 41 according to operation of the illumination operation device 3. FIGS. 4A to 4F are schematic views of the light emitting area of the oblique illumination unit 25.

Figure 4A:
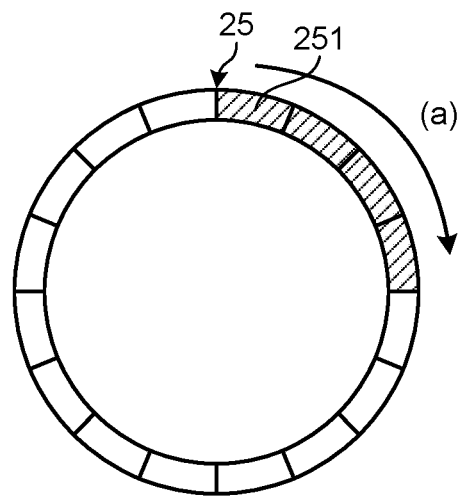
FIG. 4A is a schematic view of a light emitting area of the oblique illumination unit according to the first embodiment of the present invention.

When the user has rotated the dial 31, the illumination controller 41 changes the range of the light emitting area of the oblique illumination unit 25 according to the rotation amount corresponding to a change signal input from the dial 31. The illumination controller 41 further changes the rotational direction of the light emitting area of the oblique illumination unit 25 according to a direction signal input from the dial 31. For example, as illustrated in FIG. 4A, the illumination controller 41 causes four light emitting units 251 at the right of the oblique illumination unit 25 to emit light.

Figure 4B:
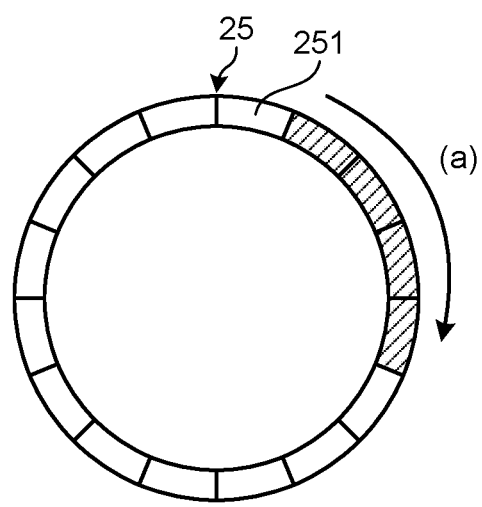
FIG. 4B is a schematic view of a light emitting area of the oblique illumination unit according to the first embodiment of the present invention.
Figure 4C:
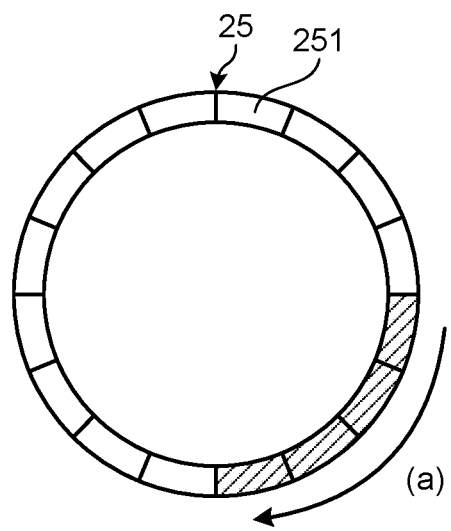
FIG. 4C is a schematic view of a light emitting area of the oblique illumination unit according to the first embodiment of the present invention.

When the user has operated the rotation changeover switch 38 and an instruction signal instructing the rotation process has been input from the rotation changeover switch 38, the illumination controller 41 performs a rotation mode process of changing the light emitting area of the oblique illumination unit 25 by one unit at regular time intervals while maintaining the light emitting area. Specifically, as illustrated in FIGS. 4A to 4C, the illumination controller 41 changes the light emitting area of the light emitting units 251 by one unit (see the arrow (a)) at regular time intervals while maintaining the light emitting area of the oblique illumination unit 25 (FIG. 4A→FIG. 4B→FIG. 4C). Since this allows the light emitting area of the oblique illumination unit 25 to move continuously without the user's operation of the illumination operation device 3, the user has free hands, which allows the user to observe damage and irregularity on a specimen SP while performing an adjustment operation such as stage operation and focusing operation.

Note that, during the rotation mode process, the illumination controller 41 does not accept control according to an instruction signal input from the dial 31 even if the dial 31 is operated. When an instruction signal for stopping the rotation mode process has been input from the rotation changeover switch 38 thereafter, the illumination controller 41 stops the rotation mode process of the oblique illumination unit 25. When the dial 31 has been operated after this rotation mode process was stopped, the illumination controller 41 changes the range of the light emitting area of the oblique illumination unit 25 according to a change signal input from the dial 31.

When an instruction signal for changing the shift amount of the light emitting area of the oblique illumination unit 25 has been input from the shift amount change button 34 during the rotation mode process performed by the oblique illumination unit 25, the illumination controller 41 changes the light emitting area of the light emitting area of the oblique illumination unit 25 by a 90-degree interval or a 180-degree interval. This facilitates comparison between the ways in which images with oblique illumination emitted to a specimen SP from certain directions.

Furthermore, when a switch signal for switching the rotation speed is input from the rotation speed change button 35 during the rotation mode process performed by the oblique illumination unit 25, the illumination controller 41 changes the rotation speed of the light emitting area of the oblique illumination unit 25. This allows whether or not and in which direction oblique illumination is emitted to be easily figured out during observation when the rotation speed of the light emitting area of oblique illumination emitted by the oblique illumination unit 25 has been changed, such as when the rotation speed is lowered, for example.

Figure 4D:
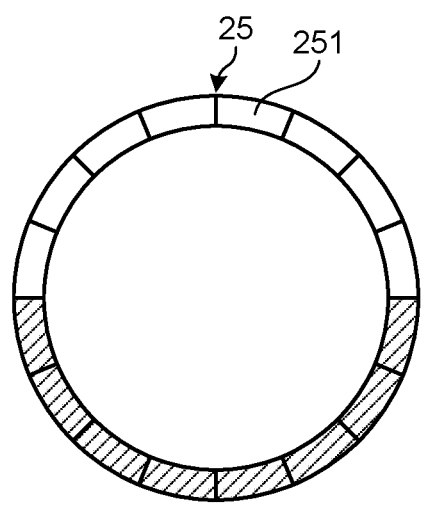
FIG. 4D is a schematic view of a light emitting area of the oblique illumination unit according to the first embodiment of the present invention.
Figure 4E:
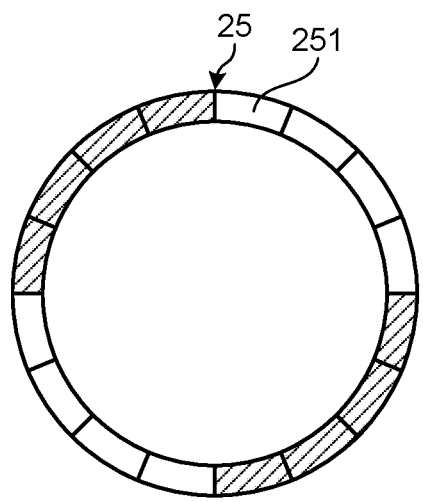
FIG. 4E is a schematic view of a light emitting area of the oblique illumination unit according to the first embodiment of the present invention.
Figure 4F:
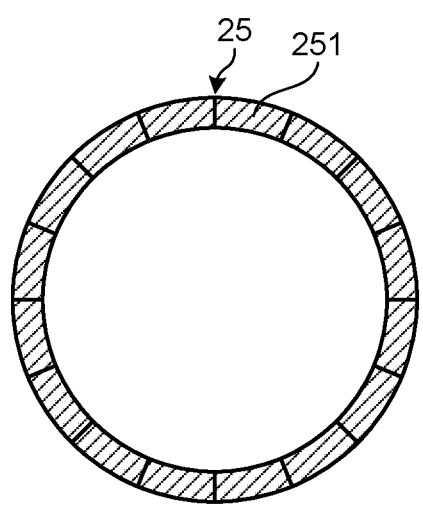
FIG. 4F is a schematic view of a light emitting area of the oblique illumination unit according to the first embodiment of the present invention.
Figure 5A:
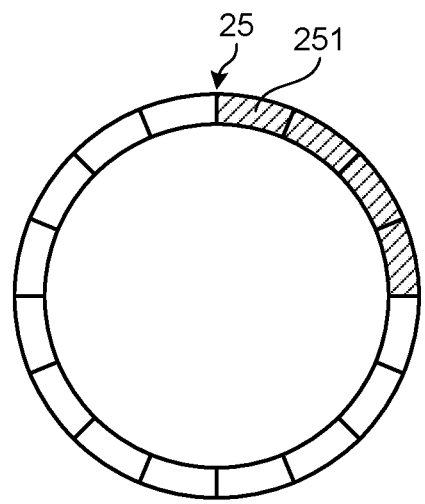
FIG. 5A is a schematic view of a lighting pattern of the light emitting area of the oblique illumination unit according to the first embodiment of the present invention.
Figure 5B:
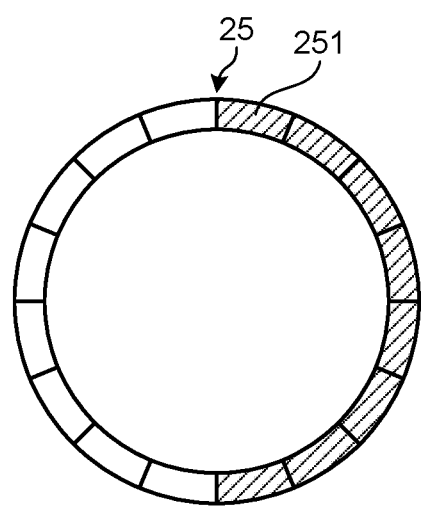
FIG. 5B is a schematic view of a lighting pattern of the light emitting area of the oblique illumination unit according to the first embodiment of the present invention.
Figure 5C:
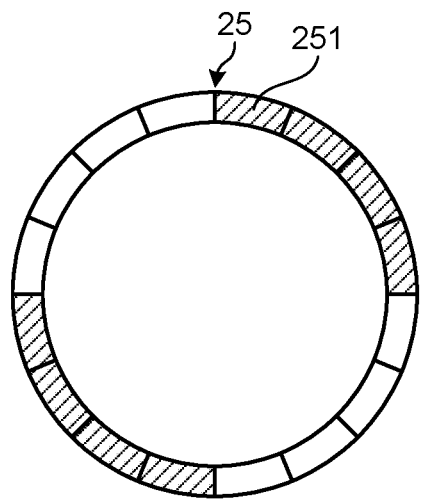
FIG. 5C is a schematic view of a lighting pattern of the light emitting area of the oblique illumination unit according to the first embodiment of the present invention.
Figure 5D:
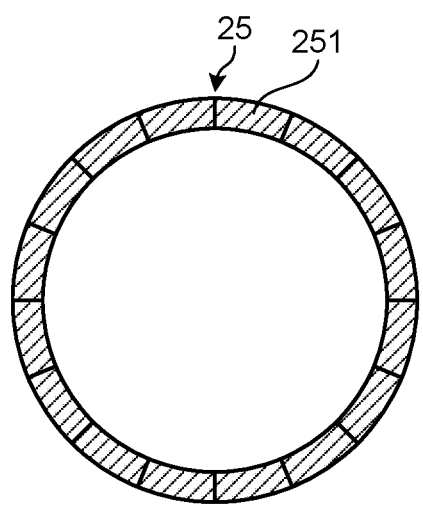
FIG. 5D is a schematic view of a lighting pattern of the light emitting area of the oblique illumination unit according to the first embodiment of the present invention.

When the lighting mode switch button 33 has been operated by the user and an instruction signal for switching the lighting pattern has been input from the lighting mode switch button 33, the illumination controller 41 causes the oblique illumination unit 25 to emit oblique illumination light in a preset lighting pattern. Specifically, as illustrated in FIGS. 4D to 4F, each time an instruction signal for switching the lighting pattern is input from the lighting mode switch button 33, the illumination controller 41 changes the light emitting area of oblique illumination emitted by the oblique illumination unit 25 and causes the oblique illumination unit 25 to emit oblique illumination light with the changed light emitting area. More specifically, as illustrated in FIGS. 5A to 5D, each time an instruction signal for switching the lighting pattern is input from the lighting mode switch button 33, the illumination controller 41 causes the light emitting area of the oblique illumination unit 25 to emit light in one of the following lighting patterns: an area of 90 degrees (pattern 1), an area of 180 degrees (pattern 2), axisymmetrical areas (pattern 3), and the whole area (pattern 4) (FIG. 5A→FIG. 5B→FIG. 5C→FIG. 5D). As a result of repeating the lighting patterns depending on the specimen SP in this manner, the takt time can be shortened.

When the rotational direction changeover switch 37 has been operated by the user and a direction signal indicating the rotational direction has been input from the rotational direction changeover switch 37, the illumination controller 41 changes the rotational direction to the direction according to the direction signal input from the rotational direction changeover switch 37. This allows the rotational direction of the oblique illumination emitted by the oblique illumination unit 25 to be set according to the user's preference.

When the oblique illumination blinking changeover switch 39 has been operated by the user and a blinking signal that instructs blinking of the oblique illumination unit 25 has been input from the oblique illumination blinking changeover switch 39, the illumination controller 41 causes the oblique illumination unit 25 to blink at predetermined intervals. As a result, since the position of damage or irregularity on a specimen SP is highlighted, the user can intuitively know the position of the damage or irregularity of the specimen SP.

According to the first embodiment of the present invention described above, since the illumination controller 41 automatically changes the light emitting area of the oblique illumination unit 25 at regular intervals according to the rotational direction and the rotation amount input from the dial 31, an area of the specimen SP where the user wants to illuminate, can be illuminated.

Furthermore, according to the first embodiment of the present invention, when an instruction signal instructing the rotation mode process is input from the rotation changeover switch 38, the illumination controller 41 performs the rotation mode process of automatically moving the light emitting area of the oblique illumination unit 25 by one unit at regular time intervals while maintaining the light emitting area. As a result of automatic rotation of the illumination area of the oblique illumination unit 25 in this manner, the orientation of the shadow of the damage or irregularity of the specimen SP changes, which emphasizes the position of the damage or irregularity, and damage in one direction can be easily seen, for example.

Furthermore, according to the first embodiment of the present invention, since the user has free hands during the rotation mode process performed by the oblique illumination unit 25, the user can observe damage and irregularity on a specimen SP while performing an adjustment operation such as stage operation and focusing operation.

Furthermore, according to the first embodiment of the present invention, since the lighting portions 32 emit light correspondingly to the positions of the light emitting units 251 of the oblique illumination unit 25, the user can intuitively know the light emitting area and the number of light emitting units 251 of the oblique illumination unit 25.

Alternatively, in the first embodiment of the present invention, the rotation changeover switch 38 may not be provided, the illumination controller 41 may cause the oblique illumination unit 25 to perform the rotation mode process when the user has held down the lighting mode switch button 33 for a predetermined period and an instruction signal of a predetermined period has been input from the lighting mode switch button 33, and the illumination controller 41 may stop the rotation mode process performed by the oblique illumination unit 25 when the user has held down the lighting mode switch button 33 again for a predetermined period and an instruction signal of a predetermined period has been input from the lighting mode switch button 33.

Alternatively, in the first embodiment of the present invention, the illumination controller 41 may make the oblique illumination unit 25 perform the rotation mode process when the user has rotated the dial 31 at a predetermined speed or higher, and the illumination controller 41 may stop the rotation mode process performed by the oblique illumination unit 25 when the user has operated the dial 31 again.

Alternatively, in the first embodiment of the present invention, the shift amount change button 34 may not be provided, and the illumination controller 41 may change the light emitting area of the oblique illumination unit 25 when the user has operated the dial 31 during the rotation mode process performed by the oblique illumination unit 25.

Alternatively, in the first embodiment of the present invention, the rotation speed change button 35 may not be provided, and the illumination controller 41 may changes the rotation speed of the light emitting area of the oblique illumination unit 25 according to the rotation speed of the dial 31 when the user has rotated the dial 31 during the rotation mode process performed by the oblique illumination unit 25.

Alternatively, in the first embodiment of the present invention, the rotational direction changeover switch 37 may not be provided, and the illumination controller 41 may switch the rotational direction to that of the dial 31 when the user has rotated the dial 31 during the rotation mode process performed by the oblique illumination unit 25.

Alternatively, in the first embodiment of the present invention, the oblique illumination blinking changeover switch 39 may not be provided, and the illumination controller 41 may blink the oblique illumination unit 25 when the lighting mode switch button 33 has been held down for a long time.

Second Embodiment

Next, a second embodiment of the present invention will be described. A microscope system according to the second embodiment has a configuration different from that of the microscope system 1 according to the first embodiment described above. Thus, in the following, the configuration of the microscope system according to the second embodiment will be described before explanation of a process performed by the microscope system according to the second embodiment. Note that the same elements as those in the microscope system 1 according to the first embodiment described above will be designated by the same reference numerals, and the description thereof will not be repeated.

Configuration of Microscope System

Figure 6:
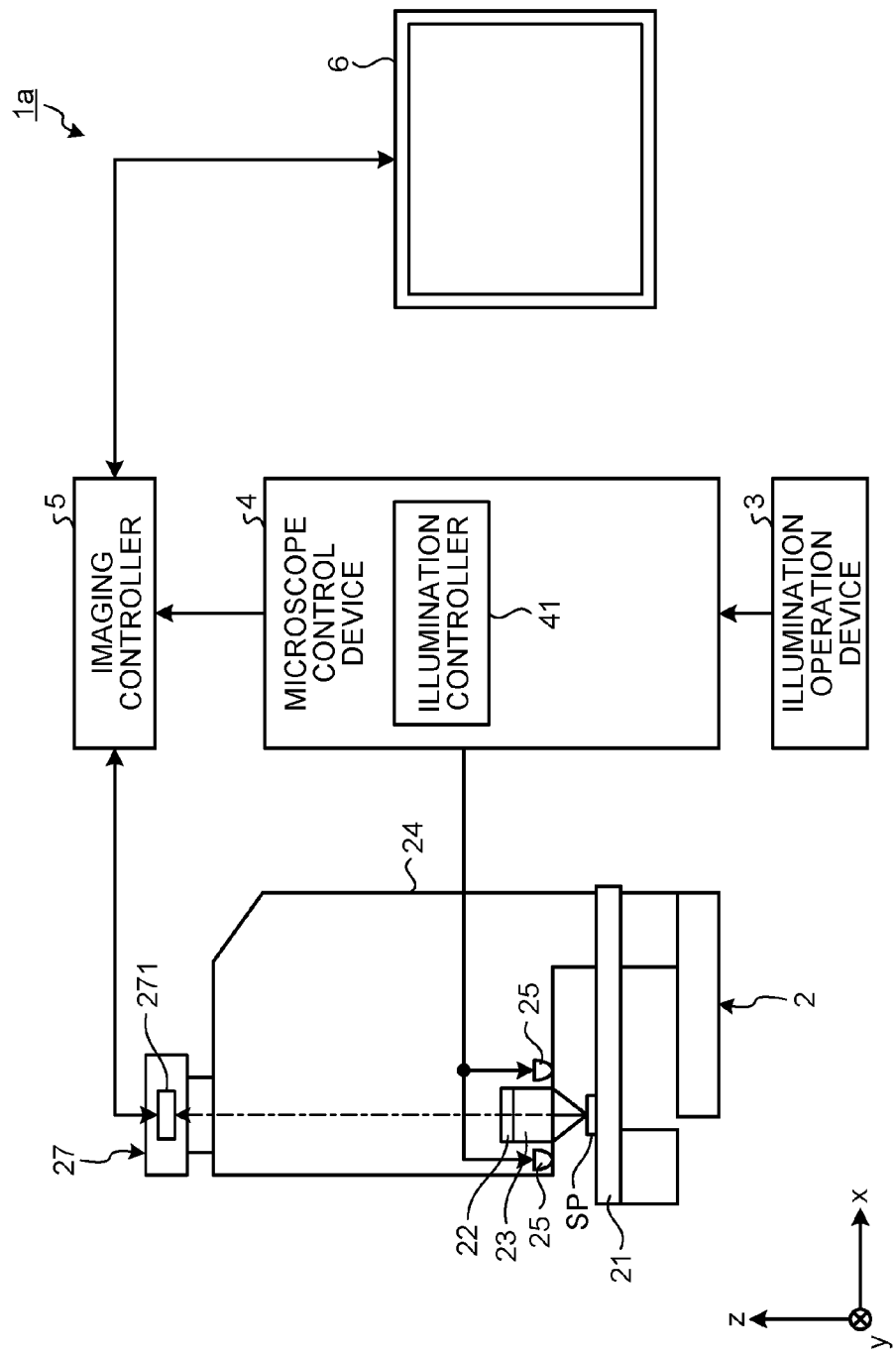
FIG. 6 is a block diagram illustrating a schematic configuration of a microscope system according to a second embodiment of the present invention.

FIG. 6 is a block diagram illustrating a schematic configuration of the microscope system according to the second embodiment of the present invention. A microscope system 1a illustrated in FIG. 6 includes an imaging unit 27 instead of the eyepiece 26 of the microscope system 1 according to the first embodiment described above. The microscope system 1a further includes an imaging controller 5 and a display device 6.

The imaging unit 27 captures an observation image of a specimen SP via an objective lens 23, performs photoelectric conversion on the observation image to generate image data of the specimen SP, and outputs the image data to the imaging controller 5. The imaging unit 27 captures a specimen SP under the control of the imaging controller 5. The imaging unit 27 is configured by an image sensor 271 such as a charge coupled device (CCD) or a complementary metal oxide semiconductor (CMOS).

The imaging controller 5 performs predetermined image processing on the image data generated by the imaging unit 27, and outputs the resulting data to the display device 6. The imaging controller 5 also causes the imaging unit 27 to image the specimen SP on the basis of a timing for changing the light emitting area of the oblique illumination unit 25 input from the microscope control device 4. The imaging controller 5 includes a CPU or the like.

The display device 6 displays an image corresponding to the image data input from the imaging controller 5. The display device 6 displays various information data on the microscope system 1a. The display device 6 includes a display panel of liquid crystal, organic electro luminescence (EL), or the like. A touch panel or the like may be provided on the display area of the display device 6.

Operation of Microscope System

Figure 7:
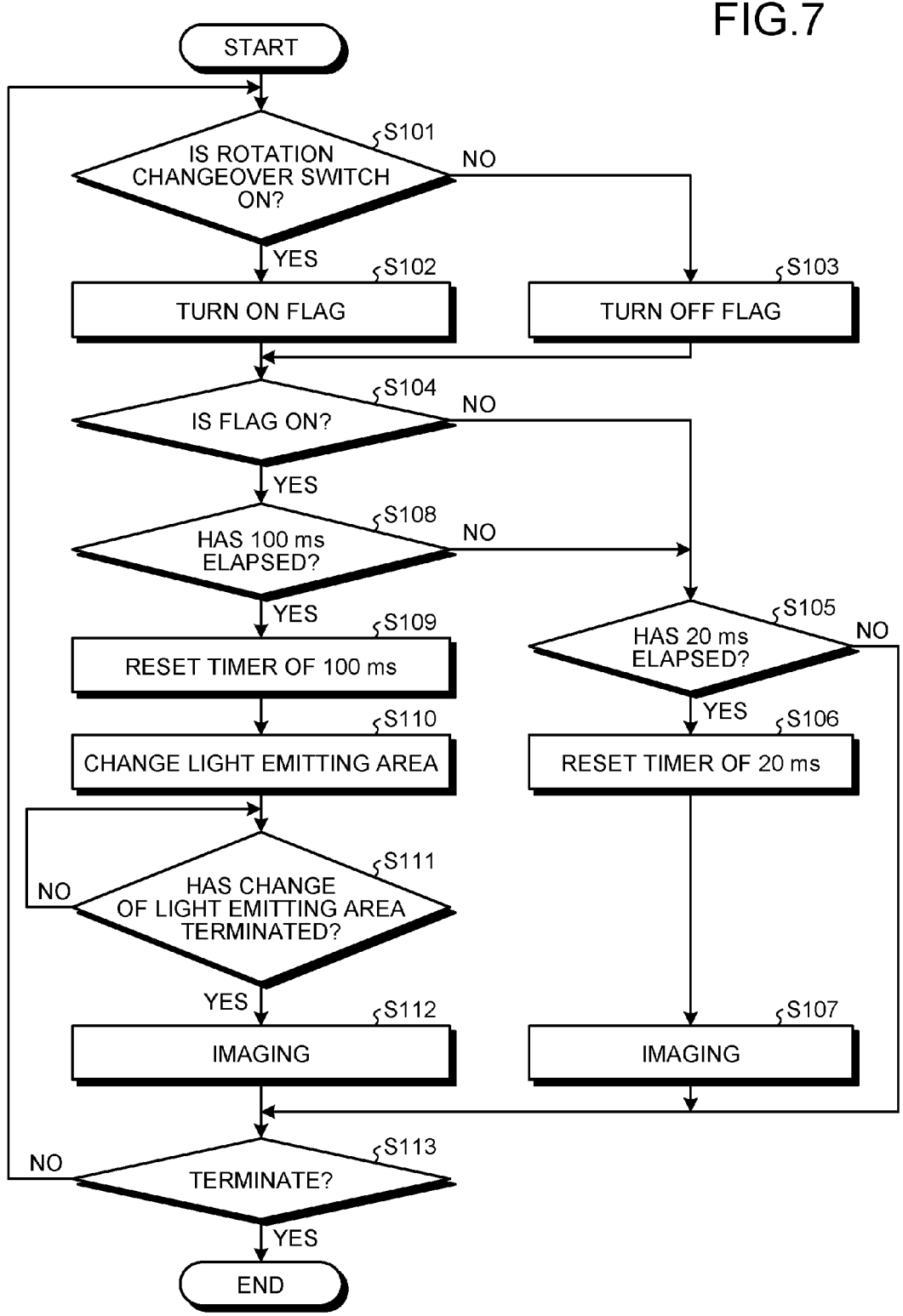
FIG. 7 is a flowchart illustrating an outline of processing performed by the microscope system according to the second embodiment of the present invention.
Figure 8:
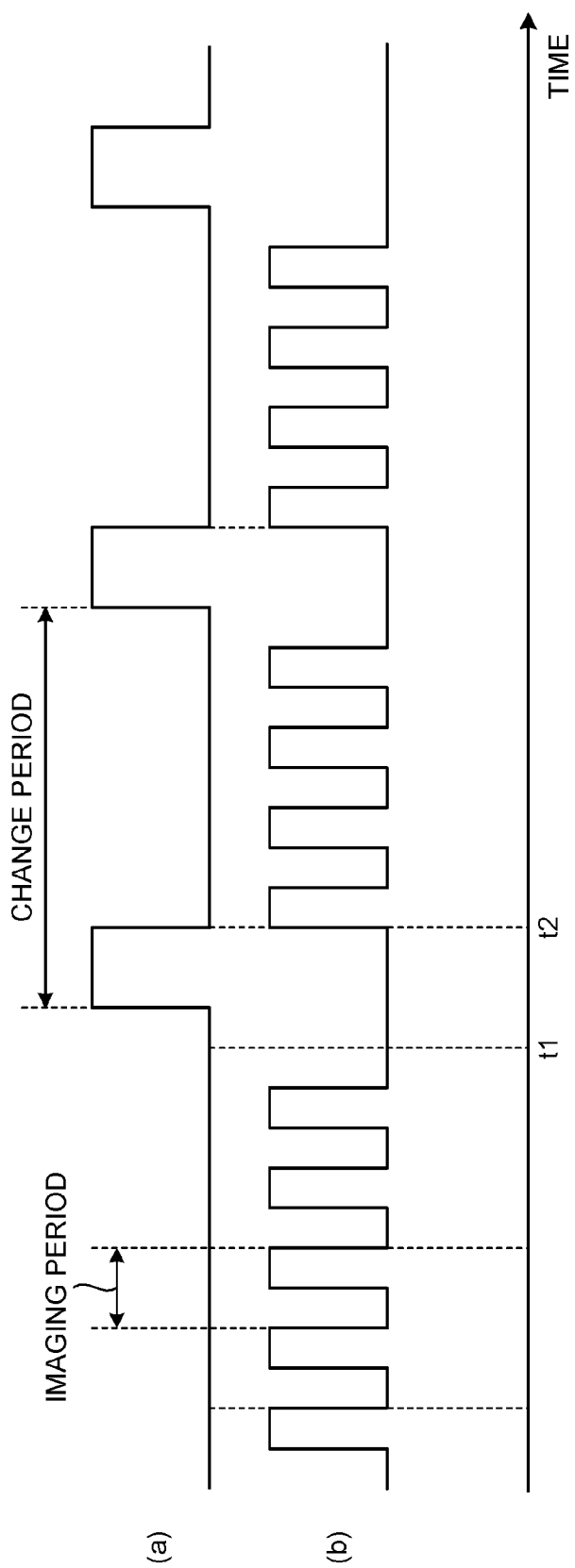
FIG. 8 is a timing chart illustrating a timing for changing a light emitting area of an oblique illumination unit and an imaging timing of an imaging unit in the microscope system according to the second embodiment of the present invention.

Next, processing performed by the microscope system 1a will be described. FIG. 7 is a flowchart illustrating an outline of the processing performed by the microscope system 1a, which is a flowchart in the rotation mode process in which the oblique illumination unit 25 performs a rotation process of changing the light emitting area while rotating the light emitting area. FIG. 8 is a timing chart illustrating a timing for changing the light emitting area of the oblique illumination unit 25 and an imaging timing of the imaging unit 27 in the microscope system 1a. In FIG. 8, (a) indicates the timing for changing the light emitting area of the oblique illumination unit 25, and (b) indicates the imaging timing of the imaging unit 27. Furthermore, in (a) of FIG. 8, the horizontal axis represents time, and a pulse rise indicates the timing for changing the light emitting area of the oblique illumination unit 25. In (b) of FIG. 8, the horizontal axis represents time, and a pulse rise indicates the imaging timing. In the following description, the imaging timing of the imaging unit 27 is 20 ms and the timing for changing the light emitting area of the oblique illumination unit 25 is 100 ms. However, each timing may be changed by a switch (not shown), for example.

As illustrated in FIG. 7, first, if an instruction signal that instructs the rotation mode process of the oblique illumination unit 25 has been input from the rotation changeover switch 38 (step S101: Yes), the microscope control device 4 turns on a flag indicating that the oblique illumination unit 25 is to perform the rotation mode process (RttFlg=1) (step S102). After step S102, the microscope system 1a proceeds to step S104, which will be described later.

If no instruction signal that instructs the rotation mode process of the oblique illumination unit 25 has been input from the rotation changeover switch 38 in step S101 (step S101: No), the microscope control device 4 turns off the flag indicating that the oblique illumination unit 25 is to perform the rotation mode process (RttFlg=0) (step S103). After step S103, the microscope system 1a proceeds to step S104, which will be described later.

Subsequently, if the flag is ON (RttFlg=1) (step S104: Yes), the microscope system 1a proceeds to step S108, which will be described later. In contrast, if the flag is OFF (RttFlg=0) (step S104: No), the microscope system 1a proceeds to step S105, which will be described later.

If 20 ms has elapsed in step S105 (step S105: Yes), the microscope control device 4 resets a timer of 20 ms (step S106). After step S106, the microscope system 1a proceeds to step S107, which will be described later. In contrast, if 20 ms has not elapsed (step S105: No), the microscope system 1a proceeds to step S113, which will be described later.

In step S107, the imaging controller 5 causes the imaging unit 27 to image the specimen SP. Specifically, as illustrated in FIG. 8, the imaging controller 5 causes the imaging unit 27 to image the specimen SP at predetermined intervals such as 20 ms. In this case, when an instruction signal indicating the light emitting area of the oblique illumination unit 25 has been input from the shift amount change button 34, the imaging controller 5 causes the imaging unit 27 to perform imaging in synchronization with the timing when the movement of the light emitting area of the oblique illumination unit 25 is terminated. After step S107, the microscope system 1a proceeds to step S113, which will be described later.

If 100 ms has elapsed in step S108 (step S108: Yes), the microscope control device 4 resets a timer of 100 ms (step S109). After step S109, the microscope system 1a proceeds to step S110, which will be described later. In contrast, if 100 ms has not been elapsed (step S108: No) the microscope system 1a proceeds to step S105.

In step S110, the illumination controller 41 changes the light emitting area of the oblique illumination unit 25.

Subsequently, when the change of the light emitting area of the oblique illumination unit 25 has been terminated (step S111: Yes), the imaging controller 5 causes the imaging unit 27 to perform imaging (step S112). Specifically, as illustrated in FIG. 8, when an instruction signal instructing the rotation mode process of the oblique illumination unit 25 has been input from the rotation changeover switch 38 (time t1) while the oblique illumination unit 25 is not performing the rotation mode process, the imaging controller 5 causes the imaging unit 27 to perform imaging at a timing (time t2) when the change of the light emitting area of the oblique illumination unit 25 is terminated. Note that, when the oblique illumination unit 25 causes the oblique illumination light to blink in a chase where the oblique illumination unit 25 performs the rotation mode process while blinking, the imaging controller 5 may cause the imaging unit 27 to image the specimen SP in synchronization with the lighting timing of the oblique illumination unit 25. After step S112, the microscope system 1a proceeds to step S113.

If the change of the light emitting area of the oblique illumination unit 25 has not been terminated in step S111 (step S111: No), the microscope system 1a waits until the change of the light emitting area of the oblique illumination unit 25 is terminated.

Subsequently, if observation of the specimen SP is to be terminated (step S113: Yes), the microscope system 1a terminates the process. In contrast, if observation of the specimen SP is not to be terminated (step S113: No), the microscope system 1a returns to step S101.

According to the second embodiment of the present invention described above, since the imaging controller 5 can synchronize the timing when the movement of the light emitting area of the oblique illumination unit 25 is terminated with the imaging timing of the imaging unit 27 so that a transient state occurring during movement of the light emitting area of the oblique illumination unit 25 can be prevented, a specimen SP can be imaged with correct exposure.

Third Embodiment

Next, a third embodiment of the present invention will be described. A microscope system according to the third embodiment has a configuration different from that of the microscope system 1a according to the second embodiment described above. Specifically, the microscope system according to the third embodiment further includes a coaxial illumination unit configured to emit coaxial illumination to a specimen SP, and has an illumination operating unit with different configuration. In the following, the configuration of the microscope system according to the third embodiment will thus be described. Note that the same elements as those in the microscope system 1a according to the second embodiment described above will be designated by the same reference numerals, and the description thereof will not be repeated.

Configuration of Microscope System

Figure 9:
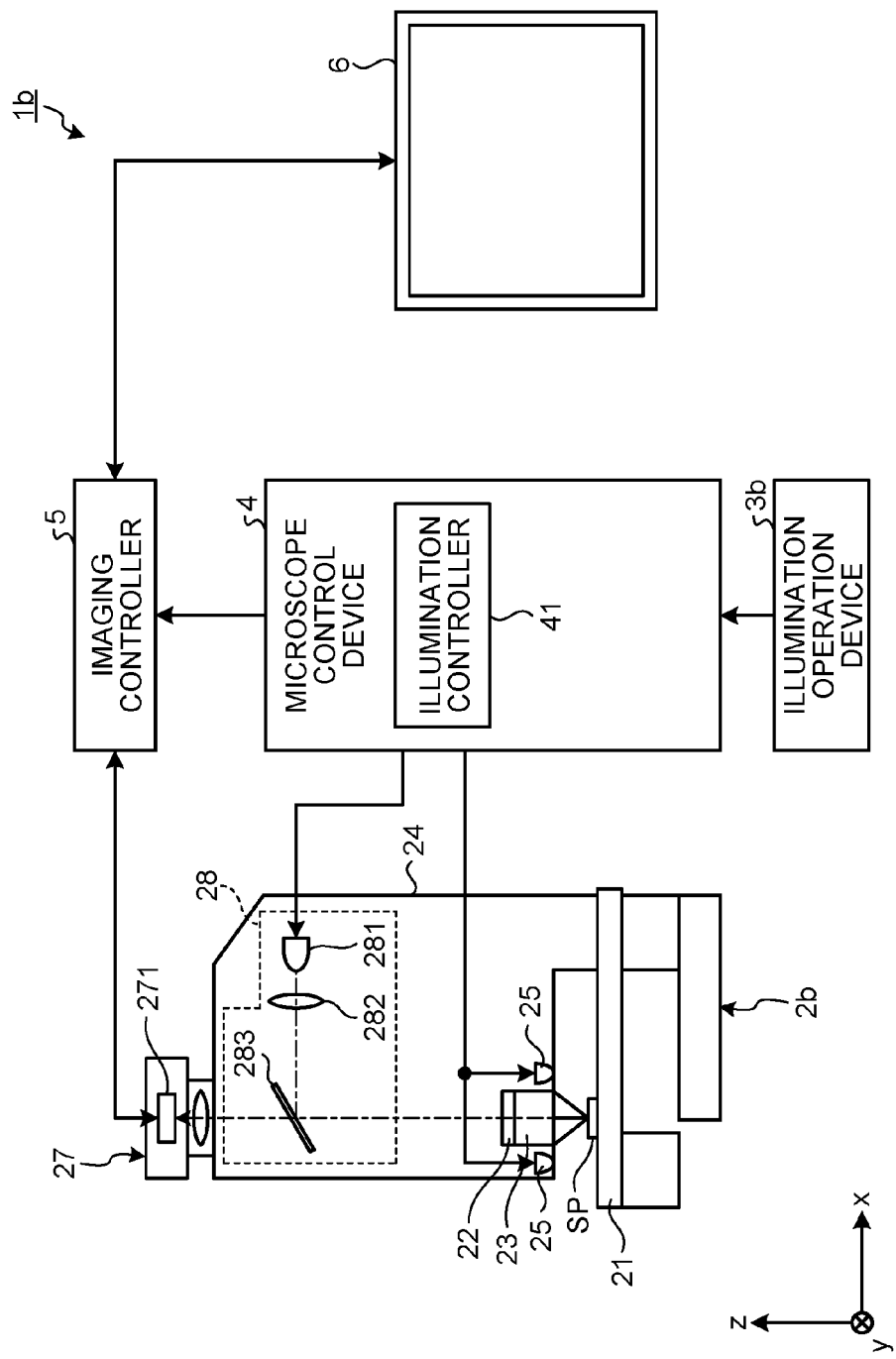
FIG. 9 is a block diagram illustrating a schematic configuration of a microscope system according to a third embodiment of the present invention.

FIG. 9 is a block diagram illustrating a schematic configuration of the microscope system according to the third embodiment of the present invention. A microscope system 1b illustrated in FIG. 9 includes a microscope apparatus 2b and an illumination operation device 3b instead of the microscope apparatus 2 and the illumination operation device 3 of the microscope system 1a according to the second embodiment described above.

Configuration of Microscope Apparatus

A configuration of the microscope apparatus 2b will be described.

The microscope apparatus 2b further includes a coaxial illumination unit 28 configured to emit illumination light for coaxial illumination to a specimen SP in addition to the configuration of the microscope apparatus 2 according to the second embodiment described above.

The coaxial illumination unit 28 includes a coaxial light source unit 281 configured to emit illumination light for coaxial illumination, an illumination lens 282 for collecting the illumination light emitted by the coaxial light source unit 281 and emitting the light to a semi-transparent mirror 283, and the semi-transparent mirror 283 for reflecting the illumination light emitted by the illumination lens 282 toward the objective lens 23 and transmitting an observation image of the specimen SP emitted from the objective lens 23 toward the imaging unit 27.

Configuration of Illumination Operating Unit

Figure 10:
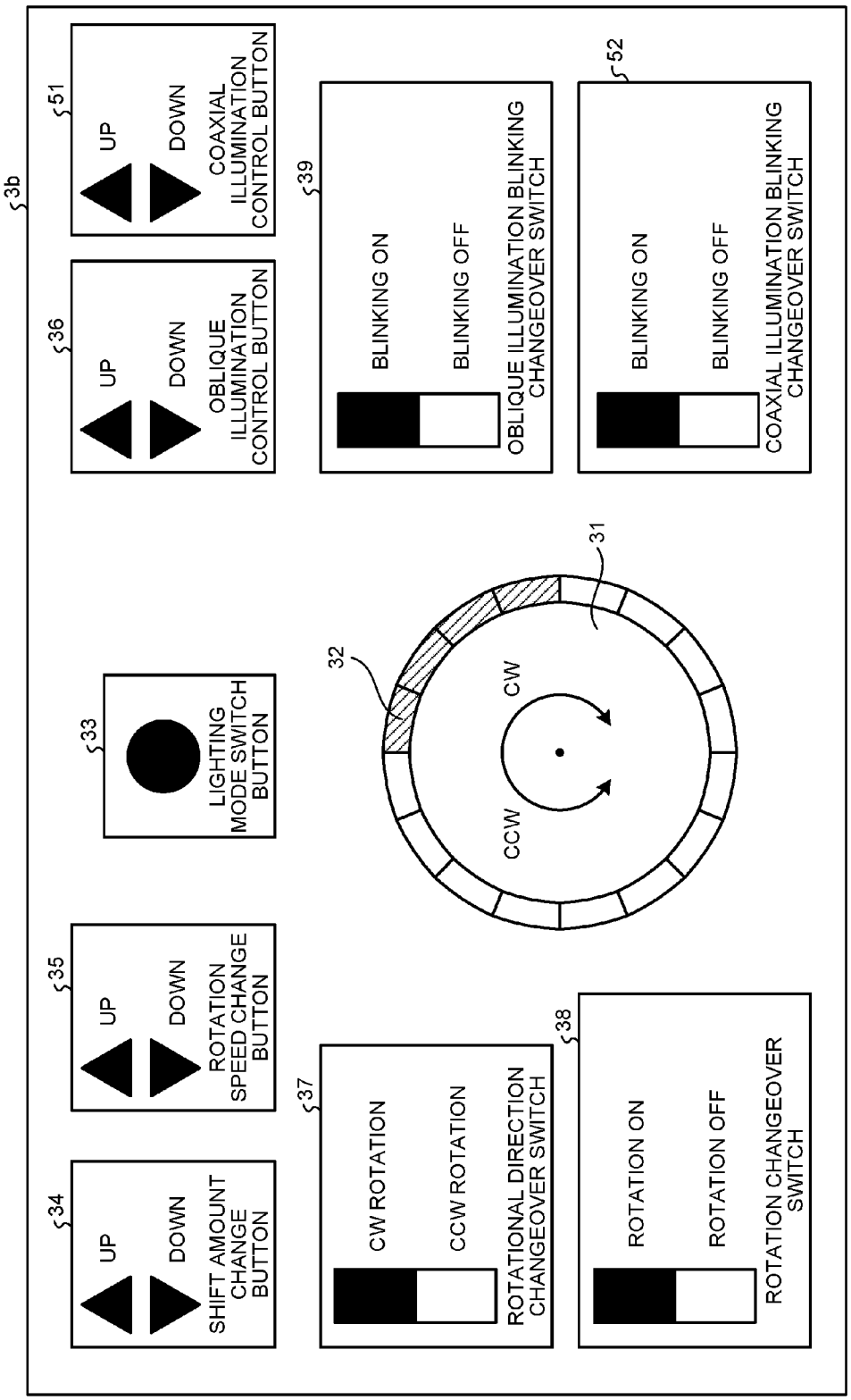
FIG. 10 is a schematic diagram illustrating a schematic configuration of an illumination operating unit of the microscope system according to the third embodiment of the present invention.

Next, a configuration of the illumination operation device 3b will be described. FIG. 10 is a schematic diagram illustrating a configuration of the illumination operation device 3b. As illustrated in FIG. 10, the illumination operation device 3b has a coaxial illumination control button 51 and a coaxial illumination blinking changeover switch 52 in addition to the configuration of the illumination operation device 3 according to the second embodiment described above.

The coaxial illumination control button 51 receives an instruction signal that instructs the light quantity of the coaxial illumination light emitted by the coaxial illumination unit 28.

The coaxial illumination blinking changeover switch 52 receives a coaxial blinking signal that instructs blinking to be performed by the coaxial illumination unit 28 or receives a coaxial lighting signal that instructs lighting.

In the microscope system 1b thus configured, when the user has operated the coaxial illumination blinking changeover switch 52 and an instruction signal instructing blinking to be performed by the coaxial illumination unit 28 has been input from the coaxial illumination blinking changeover switch 52, the illumination controller 41 causes the coaxial illumination light emitted by the coaxial illumination unit 28 to blink. When an instruction signal that instructs blinking of the oblique illumination light emitted by the oblique illumination unit 25 has been input from the oblique illumination blinking changeover switch 39 under such circumstances, the illumination controller 41 causes the oblique illumination unit 25 and the coaxial illumination unit 28 to blink in such a manner that the lighting timing of the oblique illumination unit 25 and the lighting timing of the coaxial illumination unit 28 are different from each other. In this case, the imaging controller 5 captures the specimen SP in synchronization with the lighting timing of the coaxial illumination unit 28. In this process, the illumination controller 41 causes the oblique illumination unit 25 to be always on or turns on the oblique illumination unit 25 at a timing different from the lighting timing of the coaxial illumination unit 28. When an instruction signal instructing lighting to be performed by the coaxial illumination unit 28 has been input from the coaxial illumination blinking changeover switch 52, the illumination controller 41 turns on the coaxial illumination light emitted by the coaxial illumination unit 28.

According to the third embodiment of the present invention described above, since the oblique illumination unit 25 and the coaxial illumination unit 28 are provided, an observation image of a specimen SP that can be observed with oblique illumination light and an observation image of the specimen SP that can be observed with coaxial illumination light can be compared during observation.

Modified Example

Figure 11:
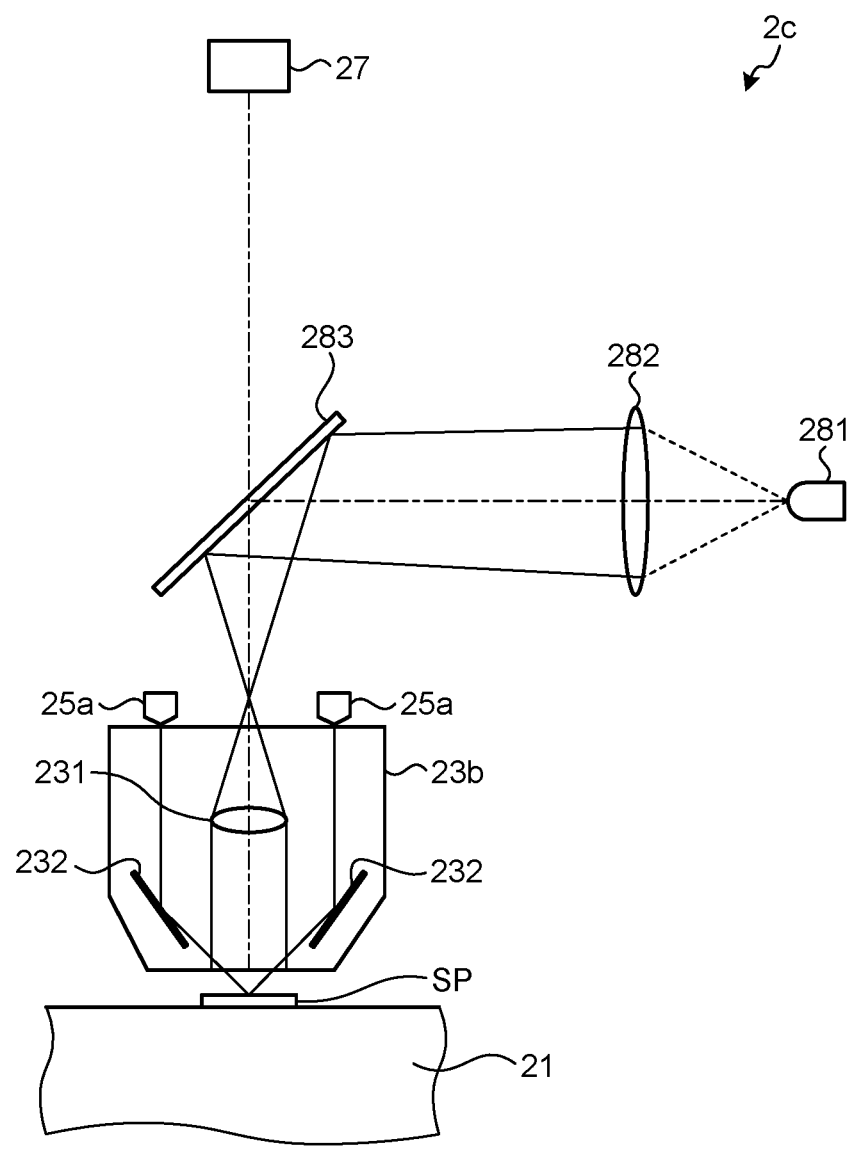
FIG. 11 is a schematic diagram illustrating an optical system and an illumination system of a microscope apparatus system of a modified example of the first to third embodiments of the present invention.

FIG. 11 is a schematic diagram illustrating an optical system and an illumination system of a microscope system according to a modified example of the first to third embodiments. In the modified example of the first to third embodiments, as illustrated in FIG. 11, a microscope apparatus 2c includes an objective lens 23b instead of the objective lens 23, and an oblique illumination unit 25a instead of the oblique illumination unit 25.

The objective lens 23b is a dark-field objective lens. Specifically, the objective lens 23b includes a condenser lens 231 configured to collect coaxial illumination light reflected from a semi-transparent mirror 283 along the optical axis of the objective lens 23b to form a collimated light flux in order to irradiate a specimen SP and configured to collect light reflected from the specimen SP, and includes a parabolic mirror 232 configured to irradiate the specimen SP with oblique illumination light emitted by the oblique illumination unit 25a obliquely with respect to the optical axis of the objective lens 23b.

The oblique illumination unit 25a is configured by ring illumination including a plurality of light sources such as LEDs arranged annularly, and is disposed so that coaxial illumination light emitted by the coaxial light source unit 281 passes through an annular internal space of the oblique illumination unit 25a.

According to the microscope apparatus 2c thus configured, the coaxial illumination light emitted by the coaxial light source unit 281 is emitted onto the specimen SP via the illumination lens 282, the semi-transparent mirror 283, and the objective lens 23b. The reflected light of the coaxial illumination light reflected from the specimen SP enters the imaging unit 27 via the objective lens 23b and the semi-transparent mirror 283. Furthermore, the oblique illumination light emitted by the oblique illumination unit 25a is emitted onto the specimen SP at an angle with respect to the optical axis of the objective lens 23b. The reflected light of the oblique illumination light reflected from the specimen SP enters the imaging unit 27 via the objective lens 23b and the semi-transparent mirror 283.

According to the modified example of the first to third embodiments described above, both of damage that can be detected with scattered light of the oblique illumination light emitted by the oblique illumination unit 25a and damage that can be detected with scattered light of the coaxial illumination light emitted by the coaxial illumination unit 28 can be observed at the same time.

Other Embodiments

While description of the present invention has been made taking examples of a microscope system including a microscope apparatus, an imaging unit, and a microscope control device, the present invention can also be applied to an objective lens for magnifying a specimen, and an imaging device having an imaging function of capturing a specimen via an objective lens and a display function of displaying an image, such as a video microscope, for example.

According to some embodiments, it is possible to simultaneously perform an operation for changing the light emitting area of the oblique illumination unit and an adjustment operation such as stage operation and focusing operation.

In the explanation of the flowchart herein, while the order of processes in respective steps have been specified with use of terms such as "first", "thereafter", "subsequently", and the like, the order of processes required for carrying out the present invention is not uniquely defined by such terms. Thus, the order of processes in the flowchart described herein can be modified without resulting in contradiction therebetween.

As described above, the present invention can include various other embodiments that are not described herein, and various modifications in designs and other modifications can be made within the scope of the technical idea defined by the claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system comprising:
    a stage on which a specimen is configured to be placed;
    an objective lens disposed so as to face the stage;
    an oblique illumination unit having a plurality of light emitting units arranged annularly around or outside the objective lens, the oblique illumination unit being configured to emit oblique illumination light for irradiating the specimen;
    an input unit configured to receive an instruction signal that instructs a rotation mode for changing, at regular intervals, a light emitting area where one or more light emitting units of the plurality of light emitting units are caused to emit the oblique illumination light; and
    an illumination controller configured to change the light emitting area at the regular intervals by controlling light emitting timing of each of the plurality of light emitting units when the input unit receives the instruction signal.

2. The microscope system according to claim 1, wherein the illumination controller is configured to move the light emitting area in a predetermined direction while maintaining the light emitting area.

3. The microscope system according to claim 1, wherein
    the input unit is configured to receive a change signal for changing a range of the light emitting area, and
    when the input unit receives the change signal, the illumination controller is configured to change the range of the light emitting area.

4. The microscope system according to claim 1, wherein
    the input unit is configured to receive a switch signal for switching a moving speed of the light emitting area, and
    when the input unit receives the switch signal, the illumination controller is configured to move the light emitting area at the moving speed according to the switch signal.

5. The microscope system according to claim 1, wherein the illumination controller is configured to change the light emitting area by sequentially switching between preset lighting patterns.

6. The microscope system according to claim 1, wherein
    the input unit is configured to receive a direction signal that instructs a rotational direction of the light emitting area, and
    when the input unit receives the direction signal, the illumination controller is configured to rotate the light emitting area in a direction according to the direction signal.

7. The microscope system according to claim 1, wherein
    the input unit is configured to receive a blinking signal that causes the light emitting area to blink, and
    when the input unit receives the blinking signal, the illumination controller is configured to perform blinking operation of repeating blinking and lighting of the one or more light emitting units within the light emitting area at predetermined intervals.

8. The microscope system according to claim 1, wherein the input unit comprises:
    a dial that is rotatable about a predetermined axis and is configured to receive a change signal for changing a range of the light emitting area and to receive a rotation signal that instructs a rotational direction of the light emitting area; and
    a plurality of lighting portions provided annularly around the dial, wherein
    the plurality of lighting portions is configured to turn on at positions corresponding to light emission of each of the plurality of light emitting units.

9. The microscope system according to claim 1, further comprising:
    an imaging unit configured to image the specimen via the objective lens to generate image data of the specimen; and
    an imaging controller configured to cause the imaging unit to image the specimen after movement of the light emitting area is terminated.

10. The microscope system according to claim 1, further comprising a coaxial illumination unit configured to emit coaxial illumination light for irradiating the specimen via the objective lens, wherein
    the illumination controller causes the coaxial illumination unit and the oblique illumination unit to turn on at different points of time.

11. The microscope system according to claim 10, wherein
    the input unit is configured to receive a coaxial blinking signal that causes the coaxial illumination unit to blink, and
    when the input unit receives the coaxial blinking signal, the illumination controller is configured to cause the coaxial illumination unit to blink.

12. An illumination operation device configured to be connected to a microscope apparatus, the microscope apparatus comprising: a stage on which a specimen is configured to be placed; an objective lens disposed so as to face the stage; and an oblique illumination unit having a plurality of light emitting units arranged annularly around or outside the objective lens, the oblique illumination unit being configured to emit oblique illumination light for irradiating the specimen,
    the illumination operation device comprising:
    an input unit that is rotatable about a predetermined axis and is configured to receive a change signal for changing a range of a light emitting area where one or more light emitting units of the plurality of light emitting units are caused to emit the oblique illumination light, and a plurality of lighting portions arranged annularly around the input unit and configured to turn on according to light emission of each of the plurality of light emitting units.

\* \* \* \* \*